(12) United States Patent
Okano

(10) Patent No.: US 8,893,132 B2
(45) Date of Patent: Nov. 18, 2014

(54) INFORMATION PROCESSING APPARATUS

(75) Inventor: Kenji Okano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1555 days.

(21) Appl. No.: 12/328,847

(22) Filed: Dec. 5, 2008

(65) Prior Publication Data

US 2009/0254911 A1 Oct. 8, 2009

(30) Foreign Application Priority Data

Dec. 7, 2007 (JP) ................................. 2007-316532

(51) Int. Cl.
G06F 9/455 (2006.01)
G06F 9/46 (2006.01)
G06F 11/14 (2006.01)

(52) U.S. Cl.
CPC .................. G06F 11/1474 (2013.01)
USPC ........................................................ 718/102

(58) Field of Classification Search
None
See application file for complete search history.

(56) References Cited

U.S. PATENT DOCUMENTS

| 6,578,159 | B1 * | 6/2003 | Kitagawa et al. | 714/15 |
| 6,594,528 | B1 * | 7/2003 | Hirano | 700/9 |
| 6,983,395 | B2 * | 1/2006 | Chen et al. | 714/4.1 |
| 2002/0040380 | A1 | 4/2002 | Harashima et al. | |
| 2004/0205376 | A1 | 10/2004 | Iida | |
| 2005/0289384 | A1 * | 12/2005 | Kehl | 714/4 |
| 2006/0259526 | A1 * | 11/2006 | Booz et al. | 707/202 |
| 2007/0101179 | A1 | 5/2007 | Chafle et al. | |

FOREIGN PATENT DOCUMENTS

| GB | 2 263 988 A | 8/1993 |
| JP | 2003-85021 | 3/2003 |
| JP | 2003-316750 | 11/2003 |
| JP | 2004-288026 | 10/2004 |
| WO | 2006/127493 A1 | 11/2006 |
| WO | 2006/127493 A2 | 11/2006 |

OTHER PUBLICATIONS

European Search Report issued Apr. 2, 2009 in corresponding European Patent Application 08170708.5.
European Search Report dated Apr. 2, 2009 and issued in corresponding European Patent Application 08170708.5.
Japanese Office Action for Application No. 2007-316532 issued May 8, 2012.

* cited by examiner

Primary Examiner — Corey S Faherty
(74) Attorney, Agent, or Firm — Staas & Halsey LLP

(57) ABSTRACT

An information processing apparatus having a storage that stores identification information for identifying an event occurring in a forefront module and completion information for identifying a module having completed the corresponding process, an identifier that identifies an event that any module has not completed the process based on the completion information, an instructor that provides the identification information related to the event identified by the identifier to the forefront module, and instructs the forefront module to execute the process related to the identified event. Each of the modules operates as a determiner that reads the completion information corresponding to the received identification information, and determines whether to skip the process of its own module, and a deliverer that delivers, the identification information to the immediately succeeding module in a case where the determiner determines to skip the process of its own module.

8 Claims, 12 Drawing Sheets

OPERATION FLAG
MANAGEMENT TABLE
22

| MODULE NAME | OPERATION FLAG |
|---|---|
| TROUBLE INFORMATION RECEPTION | 1 |
| LOG STORAGE | 1 |
| INSTRUCTION DISTRIBUTION | 1 |
| MAIL UNIT CONTROL | 1 |
| MAIL REPORT | 1 |
| SNMP REPORT | 0 |

FIG. 4

EVENT MANAGEMENT TABLE 23

| EVENT ID | OPERATION FLAG | | | | | COMPLETE FLAG | | | | | DATA |
|---|---|---|---|---|---|---|---|---|---|---|---|
| ... | ... | | | | | ... | | | | | ... |
| 0013 | 1 | 1 | 1 | 0 | 1 | 1 | 1 | 1 | 0 | 0 | ERR_FAN #3 |
| 0014 | 1 | 1 | 1 | 1 | 0 | 1 | 1 | 1 | 1 | 0 | ERR_CPU #5 |
| 0015 | 1 | 1 | 1 | 1 | 0 | 1 | 0 | 0 | 0 | 0 | ERR_FAN #1 |
| ... | ... | | | | | ... | | | | | ... |

FIG. 5

INFORMATION PROCESSING APPARATUS

CROSS-REFERENCE TO RELATED APPLICATIONS

This application is based upon and claims the benefit of priority of the prior Japanese Patent Application No. 2007-316532, filed on Dec. 7, 2007, the entire contents of which are incorporated by reference herein.

BACKGROUND

1. Field

An embodiment of the present invention relates to an information processing apparatus that causes a plurality of program modules to execute a process.

2. Description of the Related Art

The execution sequence of modules in control software having a plurality of program modules (simply called "modules" hereinafter) to control a specific apparatus is frequently determined. In the execution sequence of the modules, the modules other than the forefront module, that is the uppermost stream module, each start the process of its own module upon completion of the execution of the process of the immediately preceding module, that is, the next previous module on the upstream side.

In such an execution sequence, there are cases where the execution of a plurality of modules is started on completion of the execution of one module. Therefore, there are cases where a plurality of last, that is, downmost stream modules is present.

Expressing the unit of a series of processes by all the modules as an event, in the above-described control software, one event occurs by the occurrence of one external input or one interrupt for the forefront module. In some pieces of such control software, a plurality of events can coexist.

For example, in the control software executed by the computer incorporated in a fully automatic washing machine, the execution sequence of the modules that control water feeding, agitation, water draining, water feeding, rinsing, water draining, and dehydration, respectively, is determined. However, since the fully automatic washing machine has only one washing and drying tub to be controlled, an event never occurs before the preceding event is completed. On the other hand, for example, in the control software executed by the computer incorporated in a service processor for mainframe management, the execution sequence of the modules that control the reception of trouble information from each unit in the mainframe, the log storage of the trouble information, and the reporting of the trouble information to the outside, respectively, is also determined. However, in the mainframe and the like, since the reception and the reporting, to the outside, of trouble information can be performed at the same time, a plurality of events can coexist.

Like general systems, computers that execute this type of control software are necessarily rebooted when some kind of trouble occurs. Moreover, when there is an incomplete event for which the process is interrupted in the middle of the execution sequence at the time of the occurrence of trouble, it is necessary to complete the incomplete event.

To satisfy this demand, a function of continuing the processing of the event that is incomplete at the time of the occurrence of trouble from the middle of the execution sequence after the reboot was considered as a new function of the control software.

However, to incorporate such a function in the control software, it is necessary to make individual arrangements between upstream modules and downstream modules, and it was predicted that this would make the design of the control software extremely complicated.

Therefore, a function of re-executing the processing of the event that is incomplete at the time of the occurrence of trouble from the uppermost stream module instead of continuing the process from the middle of the execution sequence was considered as a new function of the control software. As an operation considered for this function, the identification information to identify the event that occurs in the forefront module is stored in a nonvolatile memory as a log, the identification information related to the event that is incomplete when the trouble occurs is extracted from the log after the reboot, and the extracted identification information is inputted to the forefront module.

However, even though the event itself is incomplete when trouble occurs, in many cases, the process has been finished up to a module that is present in the middle of the execution sequence. If the process of such an incomplete event is re-executed from the forefront module after the reboot, the contents outputted from any of the modules before the occurrence of the trouble are sometimes duplicately outputted from the same module.

[Patent Document 1] Japanese Unexamined Patent Application Publication No. 2003-316750

SUMMARY

An object of the present invention is to prevent the contents outputted from any of the modules before the occurrence of trouble from being duplicately outputted from the same module even if identification information which was provided once is provided again to the forefront module in order to complete the event that is incomplete at the time of the occurrence of the trouble, after the reboot when the execution sequence of a plurality of modules is determined.

The above-described embodiments of the present invention are intended as examples, and all embodiments of the present invention are not limited to including the features described above.

BRIEF DESCRIPTION OF THE DRAWINGS

FIG. 4 is a view schematically showing the table structure of an operation flag management table;

FIG. 5 is a view schematically showing the table structure of an event management table;

DETAILED DESCRIPTION OF THE PREFERRED EMBODIMENTS

Figure 1:
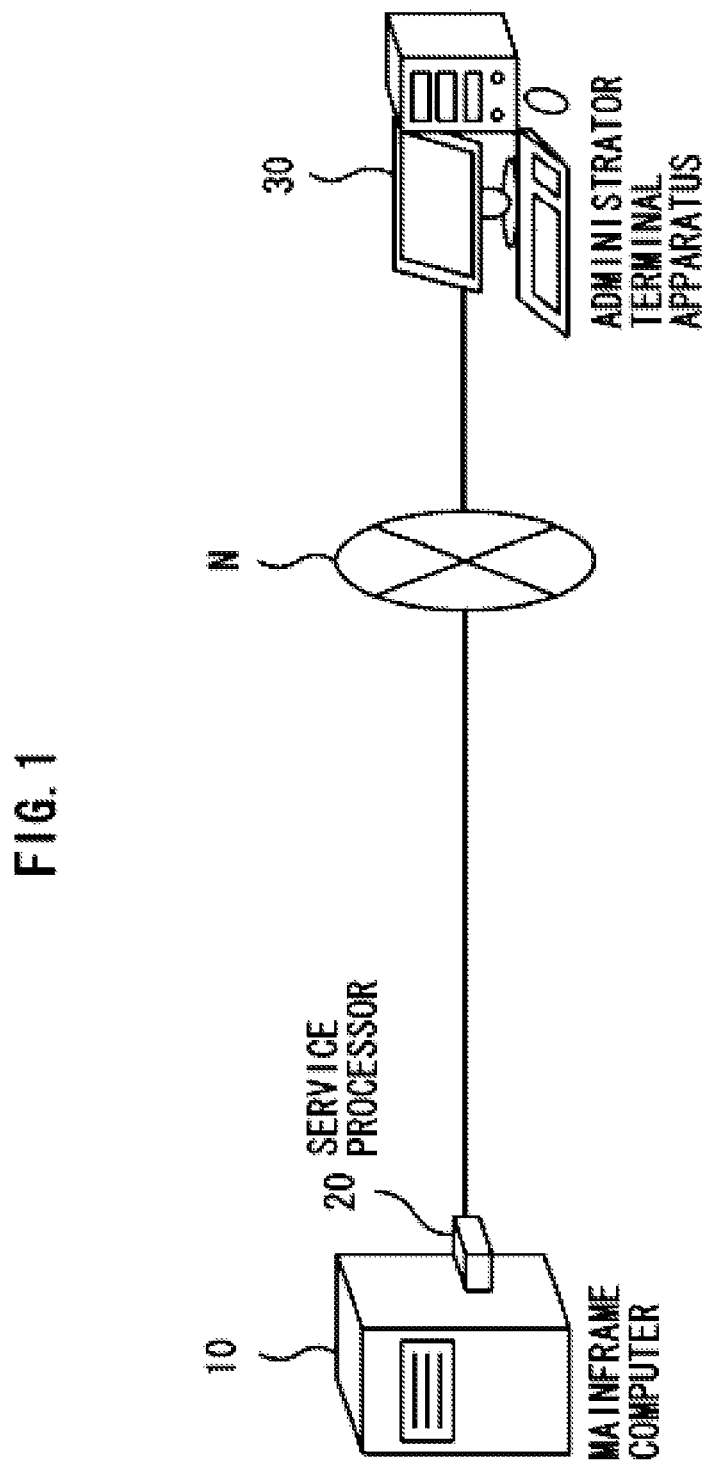
FIG. 1 is a structural view of a mainframe system of a first embodiment.

Reference may now be made in detail to embodiments of the present invention, examples of which are illustrated in the accompanying drawings, wherein like reference numerals refer to like elements throughout.

Embodiments of the present invention will be described with reference to the attached drawings. As an example of the information processing apparatus, a so-called mainframe computer will be described.

[First Embodiment]

FIG. 1 is a structural view of a mainframe system corresponding to a first embodiment.

As shown in FIG. 1, the mainframe system of the first embodiment has a main frame computer 10, a service processor 20, and an administrator terminal apparatus 30. Of these, the main frame computer 10 and the service processor 20 are connected so that communication can be performed therebetween through a non-illustrated communication line. In this embodiment, a private line can be used as the communication line. The service processor 20 and the administrator terminal apparatus 30 are connected so that communication can be performed therebetween through a network N.

The main frame computer 10 is a computer that performs clerical and scientific calculation at high speed. Although not shown in FIG. 1, the main frame computer 10 has a CPU (central processing unit), a memory unit, a storage, a power source unit, and a cooling unit. Each unit of the main frame computer 10 has an automatic trouble notification function. When trouble occurs in its own unit, the main frame computer 10 notifies the service processor 20 of the occurrence of the trouble by transmitting trouble information to identify the kind and location of the occurring trouble by the automatic trouble notification function.

The service processor 20 is an embedded device, in which a computer is embedded. The service processor 20 implements a management function to manage the setting information and operation state of the main frame computer 10. As described later, the service processor 20 has a report function to report trouble to the administrator terminal apparatus 30 when the occurrence of the trouble is notified by any of the units in the main frame computer 10. Examples of the report function include a function using electronic mail and a function using an SNMP (Simple Network Management Protocol). The service processor 20 according to the present embodiment includes a mail transmission module program to transmit electronic mail and an SNMP agent to transmit a trap representative of a state change to an SNMP manager.

The administrator terminal apparatus 30 is a computer additionally provided with an output function to perform output of predetermined information to the administrator when notification of the occurrence of trouble is provided by the service processor 20. An example of the administrator terminal apparatus 30 is a personal computer. Although not shown, the administrator terminal apparatus 30 has a display device such as a liquid crystal display, input devices such as a keyboard and a mouse, and a main unit to which these devices are connected. The main unit incorporates a communication adapter, a storage, a CPU, and a memory unit. Further, the administrator terminal apparatus 30 includes a mail reception module program to receive electronic mail and an SNMP agent to receive a trap from the SNMP manager. The administrator terminal apparatus 30 is placed, for example, in the building of a support center.

Figure 2:
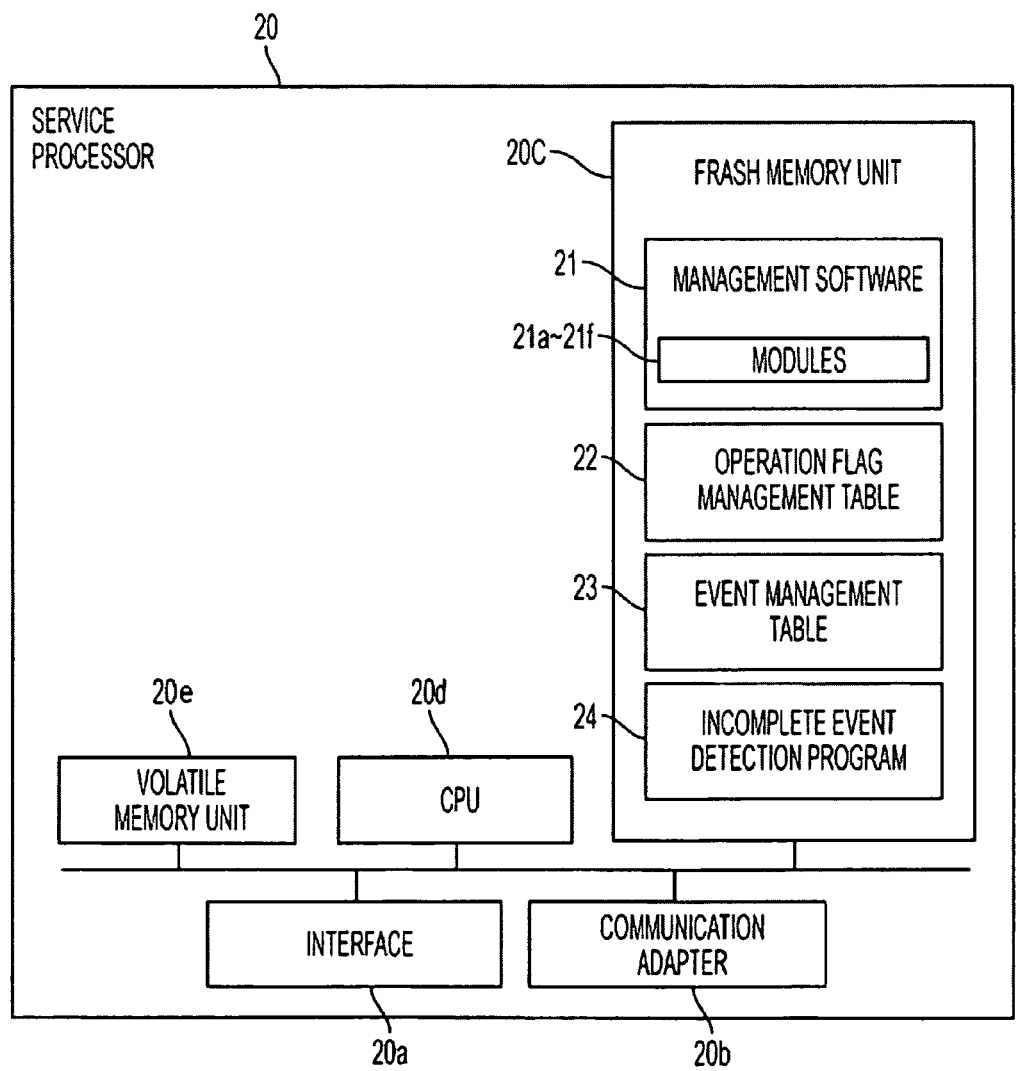
FIG. 2 is a structural view of a service processor.

FIG. 2 is a structural view of the service processor 20.

As shown in FIG. 2, the service processor 20 has at least an interface unit 20a, a communication adapter 20b, a flash memory unit 20c, a CPU 20d, and a volatile memory unit 20e.

The interface unit 20a is a device that exchanges data with each unit in the main frame computer 10, and is connected to each unit in the main frame computer 10 by a non-illustrated private line. The communication adapter 20b is a communication device that exchanges data with other computers on the network N, and is connected to a relay device in the network N by a predetermined communication cable. Examples of the relay device include a router and a terminal adapter. Examples of the communication cable include a modular cable and an Ethernet cable (Ethernet is a trademark of Xerox USA).

The flash memory unit 20c stores various kinds of programs and data. The CPU 20d performs several processes according to the programs stored in the flash memory unit 20c. The volatile memory unit 20e is for the CPU 20d to cache programs and data and develop the work area.

The service processor 20 stores management software 21 in the flash memory unit 20c. The management software 21 manages the setting information and operation state of the main frame computer 10. The management software 21 has a plurality of modules, and these modules are in cooperation with one another to implement a management function. In the following, description will be given with respect to, of the plurality of modules constituting the management software 21, six modules 21a to 21f of an abnormality processing system.

Figure 3:
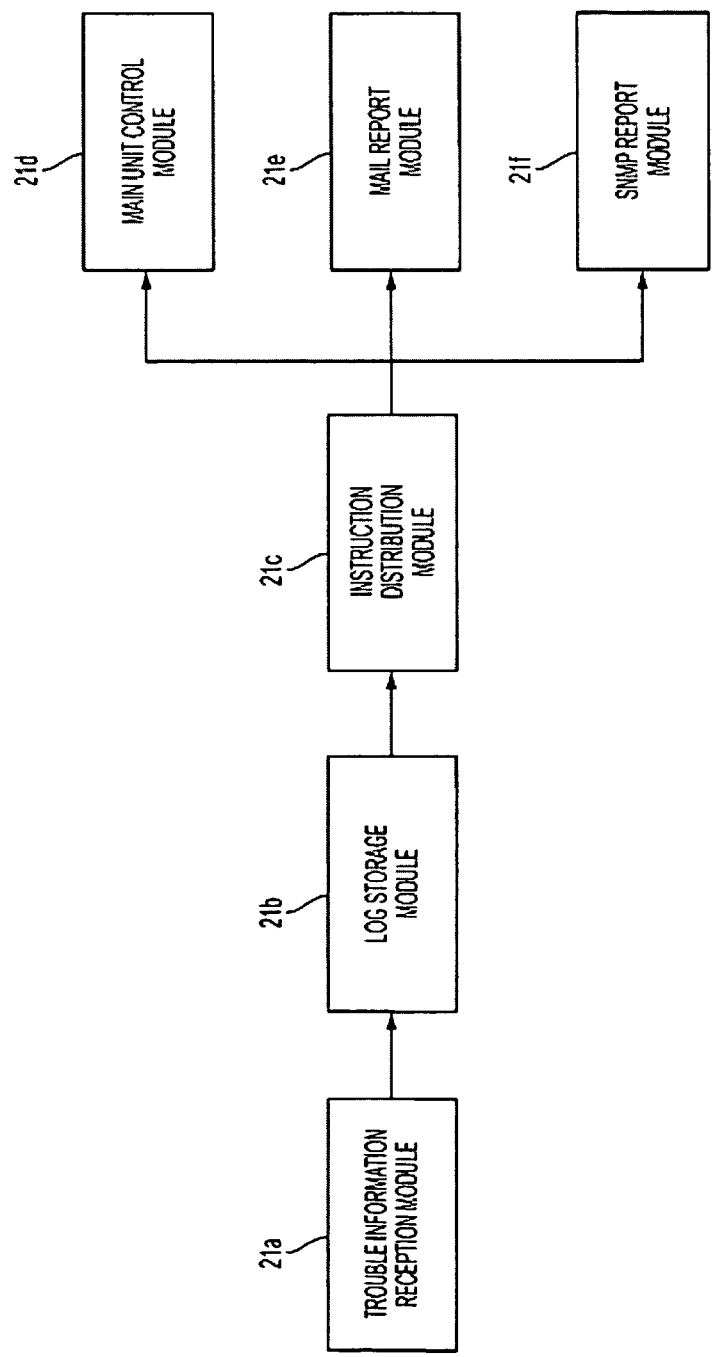
FIG. 3 is a view showing the relation between six modules of an abnormality processing system.

FIG. 3 is a view showing the relation between the six modules 21a to 21f of the abnormality processing system.

As shown in FIG. 3, the management software 21 has trouble information reception module 21a, a log storage module 21b, an instruction distribution module 21c, a main unit control module 21d, a mail report module 21e, and an SNMP report module 21f.

The trouble information reception module 21a receives trouble information from any of the units in the main frame computer 10 as input information. The log storage module 21b stores, in a non-illustrated log file, the trouble information received by the trouble information reception module 21a from any of the units in the main frame computer 10. The instruction distribution module 21c instructs the modules 21d to 21f on the downstream side of its own module to start the execution of the process at the same time.

The main unit control module 21d controls the units in the main frame computer 10 according to the kind and location of the trouble identified by the trouble information received by the trouble information reception module 21a. When notification of a fatal error is provided by any of the CPUs in the main frame computer 10, the main unit control module 21d resets the system board where the CPU that provided the error notification is mounted. When notification of a stop of the cooling fan is provided by any of the cooling units in the main frame computer 10, the main unit control module 21d instructs the other cooling units in the main frame computer 10 to increase the rotational speeds of the cooling fans.

The mail report module 21e transmits, to a predetermined address, electronic mail reporting the contents and location of the trouble identified by the trouble information, and includes a general mail transmission module. The SNMP report module 21f reports, to the SNMP manager, the occurrence of trouble in any of the units in the main frame computer 10 according to the SNMP, and includes a general SNMP agent.

The execution sequence is predetermined for the six modules 21a to 21f. Specifically, as shown in FIG. 3, the trouble information reception module 21a is on the uppermost stream side in the execution sequence. When the trouble information reception module 21a completes the process, notification of the completion of the process is provided to the log storage module 21b. When receiving the notification from the trouble information reception module 21a, the log storage module 21b starts the process. That is, the log storage module 21b starts the process of its own module upon completion of the process of the trouble information reception module 21a. Likewise, the instruction distribution module 21c immediately succeeding the log storage module 21b starts the process of its own module upon completion of the process of the log storage module 21b.

Moreover, the main unit control module 21d, the mail report module 21e, and the SNMP report module 21f each start the process of their own modules upon completion of the process of the instruction distribution module 21c. In the first embodiment, the main unit control module 21d, the mail report module 21e, and the SNMP report module 21f are the downmost stream modules in the execution sequence.

Further, the modules 21a to 21c other than the modules 21d to 21f each provide notification of the completion of the process of their own modules and deliver an event ID described later to the immediately succeeding module.

The modules constituting a portion of the management software 21 each determine whether to execute the process of their own modules or not according to the state of the operation setting. That is, even if the immediately preceding modules complete their own processes, the modules do not perform the process upon the completion while the operation settings of their own modules are invalid. The operation settings are switched through non-illustrated operation means by the operator of the service processor 20 or switched through non-illustrated remote control means by the operator or the administrator of the administrator terminal apparatus 30 connected to the service processor 20 through the network N.

However, in the execution sequence as shown in FIG. 3, when the operation setting of any of the three upstream side modules 21a to 21c is invalid, the process of the entire abnormality processing system is incomplete. Therefore, in the first embodiment, it is assumed that only the operation setting states of the three modules 21d to 21f which diverge from the instruction distribution module 21c can be switched and the operation setting states of the front three modules 21a to 21c are always fixed to be valid.

Moreover, as shown in FIG. 2, the service processor 20 stores an operation flag management table 22 in the flash memory unit 20c. The operation flag management table 22 manages the operation setting states of the modules constituting the management software 21.

FIG. 4 is a view schematically showing the table structure of the operation flag management table 22.

As shown in FIG. 4, the operation flag management table 22 has records of all of the modules constituting the management software 21. Since description is given with respect to the six modules 21a to 21f of the abnormality processing system in the first embodiment as mentioned above, only six records are shown in FIG. 4. The records of the operation flag management table 22 each have a "module name" field and an "operation flag" field.

The name of each module is recorded in the "module name" field. An operation flag representative of whether the operation setting of each module is valid or invalid is stored in the "operation flag" field. In FIG. 4, the operation flag is represented by a value "1" or "0". The operation flag "1" represents that the operation setting of the corresponding module is valid, and the operation flag "0" represents that the operation setting of the corresponding module is invalid. Moreover, FIG. 4 schematically shows the management configuration of the operation flag. The operation flag may be managed, for example, by a bit map method in which a bit for recording the operation flag is assigned one to each module.

Moreover, as shown in FIG. 2, the service processor 20 stores an event management table 23 in the flash memory unit 20c. The event management table 23 stores information for event management. Here, an event is the unit of a series of processes by the whole of the six modules 21a to 21f. The trouble information reception module 21a which is the uppermost stream module receives one piece of trouble information as input information, whereby one event occurs.

FIG. 5 is a view schematically showing the table structure of the event management table 23.

As shown in FIG. 5, the records of the event management table 23 each have an "event ID" field, an "operation flag" field, a "completion flag" field, and a "data" field.

An event ID assigned to an event as unique identification information is recorded in the "event ID" field. The states of all the operation flags recorded in the operation flag management table 22 are recorded at the point of time of the occurrence of each event in the "operation flag" field. Since six operation flags are shown in FIG. 4, six operation flags are recorded in the "operation flag" field of the event management table 23.

A completion flag representative of whether the process has been completed or not is recorded for each event in the "completion flag" field. The completion flags of all the modules constituting the management software 21 are recorded in the "completion flag" field. Since description is given with respect to the six modules 21a to 21f of the abnormality processing system in the first embodiment, only the completion flags of the six modules 21a to 21f are shown in FIG. 5. In FIG. 5, the completion flag is represented by a value "1" or "0". The completion flag "1" represents that the process of the corresponding module is completed for the event. The completion flag "0" represents that the process of the corresponding module is not completed for the event.

Trouble information related to each event is recorded in the "data" field. That is, when one event occurs by the trouble information reception module 21a receiving one piece of trouble information, the received piece of trouble information is recorded in the "data" field of the record of the occurring event.

The event management table 23 corresponds to the above-described storage. The service processor 20 stores the event ID, the operation flag, the completion flag, and the trouble information in the flash memory unit 20c through the event management table 23, which corresponds to the above-described storage procedure.

Moreover, as shown in FIG. 2, the service processor 20 stores an incomplete event detection program 24 in the flash memory unit 20c. The incomplete event detection program 24 is for detecting an incomplete event immediately after the power of its own processor is turned on. Here, an incomplete event is an event for which the process has not been completed by at least one of the modules whose operation settings are valid. The contents of the process executed by the CPU 20d according to the incomplete event detection program 24 will be described later by using FIG. 9.

<Processing Related to the Modules>

Figure 6:
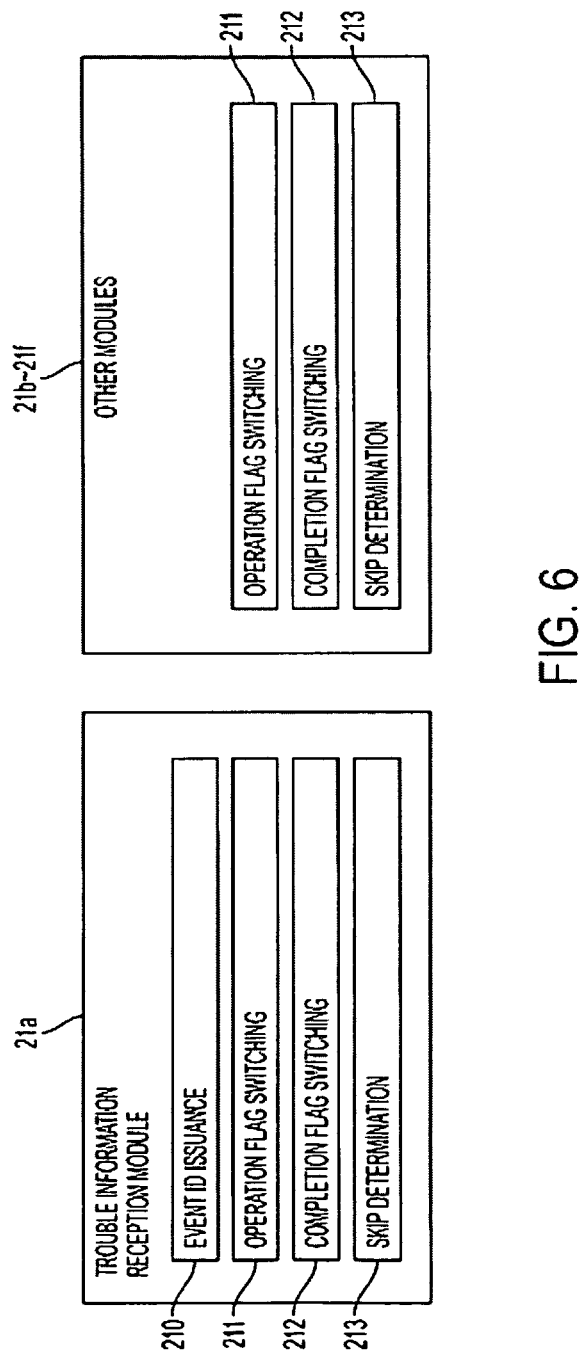
FIG. 6 is a view showing the functions, according to the present embodiment, of the six modules.

FIG. 6 is a view showing the functions of the six modules 21a to 21f according to an embodiment of the present embodiment.

As shown in FIG. 6, the trouble information reception module 21a on the uppermost stream side in the execution sequence of the six modules 21a to 21f includes an event ID issuance program 210, an operation flag switching program 211, a completion flag switching program 212, and a skip determination program 213.

The other five modules 21b to 21f not at the forefront of the execution sequence do not include the event ID issuance program 210, although they include the operation flag switching program 211, the completion flag switching program 212, and the skip determination program 213.

(Event ID Issuance)

The event ID issuance program 210 issues an event ID in response to the occurrence of an event and adds a new record to the event management table 23 of FIG. 5. The event ID issuance program 210 is executed when one event occurs by the trouble information reception module 21a receiving one piece of trouble information from any of the units in the main frame computer 10 as input information.

Figure 7:
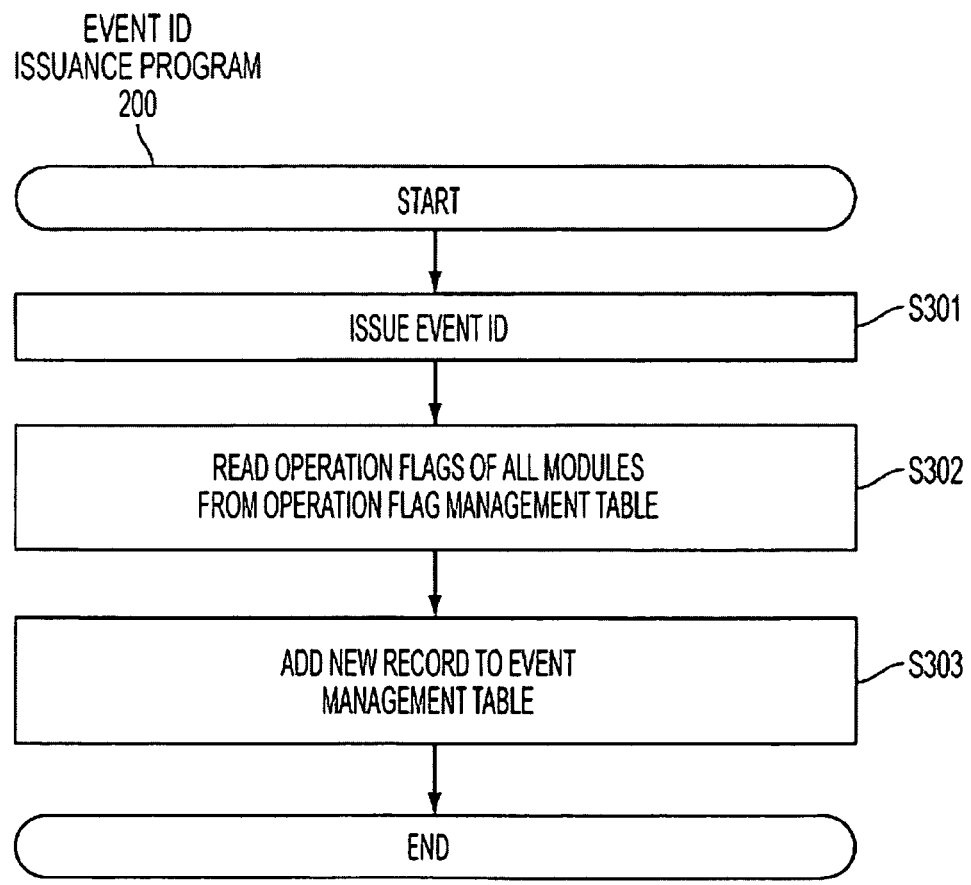
FIG. 7 is a view showing the flow of an event ID issuance process.

FIG. 7 is a view showing the flow of the event ID issuance process executed by the CPU 20d according to the event ID issuance program 210.

After the event ID issuance process is started, the CPU 20d executing the trouble information reception module 21a issues an event ID corresponding to the event at S301. The CPU 20d issues, as the event ID, a new event ID that has not been used in the event management table 23 in the flash memory unit 20c.

At S302, the trouble information reception module 21a reads the operation flag states of all the modules 21a to 21f at the point of time of the occurrence of the event, from the operation flag management table 22 in the flash memory unit 20c.

At S303, the trouble information reception module 21a adds, to the event management table 23 in the flash memory unit 20c, a new record including the event ID issued at operation S301 and the operation flag states of all the modules read at operation S302. In the added new record, the completion flags of all the modules recorded in the "completion flag" field are "0" as the initial value. In the "data" field of the new record, the trouble information received by the trouble information reception module 21a with respect to the event is recorded. When finishing the process of S303, the trouble information reception module 21a ends the event ID issuance process according to FIG. 7.

According to the event ID issuance process shown in FIG. 7, the trouble information reception module 21a can issue an event ID for an event that occurs by the reception of trouble information from any of the units in the main frame computer 10. Moreover, in the event ID issuance process shown in FIG. 7, the record related to the event can be added to the event management table 23 in the flash memory unit 20c as a new record.

While a new record is added to the event management table 23 in the event ID issuance process of FIG. 7, the record recording configuration is not limited thereto. For example, in a case where the storage area allocated to the event management table 23 is determined in the flash memory unit 20c, when there is no free space in the storage area, the record with the oldest event ID of the records other than the record of the incomplete event may be overwritten with the new record.

Since description is given with respect to the six modules 21a to 21f of the abnormality processing system in the first embodiment, the event ID issuance program 210 issues the event ID upon reception of trouble information. However, the event ID issuance program 210 is also incorporated in the forefront modules in the execution sequences by the modules of systems other than the abnormality processing system. Therefore, when the event ID issuance program 210 is provided in the forefront modules of other systems, it issues an event ID when an event occurs at the modules.

(Operation Flag Switching)

The operation flag switching program 211 switches the operation flag of its own module in the operation flag management table 22 in the flash memory unit 20c upon switching of the operation setting of its own module. As mentioned above, the operation settings of the modules are switched through non-illustrated operation means by the operator of the service processor 20 or switched through non-illustrated remote control means by the operator of the administrator terminal apparatus 30 connected to the service processor 20 through the network N. The CPU 20d executing each module monitors the execution of the operation setting switching according to the operation flag switching program 211. When the operation state of its own module is switched, the module changes the state of the operation flag of its own module recorded in the operation flag management table 22 in the flash memory unit 20c to the state corresponding to the operation setting to which switching is made. The operation flag switching program 211 is incorporated not only in the six modules 21a to 21f of the abnormality processing system but in all the modules included in the management software 21.

(Completion Flag Switching)

The completion flag switching program 212 switches, upon the completion of the process of its own module for an event, the completion flag of its own module in the record, corresponding to the processing-completed event, recorded in the event management table 23 in the flash memory unit 20c, from "0" to "1". After generating information to provide notification of the completion of execution and delivering it to the immediately succeeding module, according to the completion flag switching program 212, the CPU 20d executing each module switches, from "0" to "1", the completion flag of its own module in the record, corresponding to the processing-completed event, recorded in the event management table 23 in the flash memory unit 20c. For the modules 21d to 21f situated on the downmost stream side in the execution sequence, the completion flag of its own module is switched after external output is finished. The completion flag switching program 212 is also incorporated not only in the six modules 21a to 21f of the abnormality processing system but in all the modules included in the management software 21.

(Skip Determination)

The skip determination program 213 determines, before the process of its own module is started, whether to execute or skip the process. The skip determination program 213 is executed when the notification of the completion of the process and the event ID is sent from the immediately preceding module. For the trouble information reception module 21a situated on the uppermost stream side in the execution sequence, the skip determination program 213 is executed by the reception of a process start instruction and the event ID from an incomplete event detection process described later. The skip determination program 213 is also incorporated not only in the six modules 21a to 21f of the abnormality processing system but in all the modules included in the management software 21.

Figure 8:
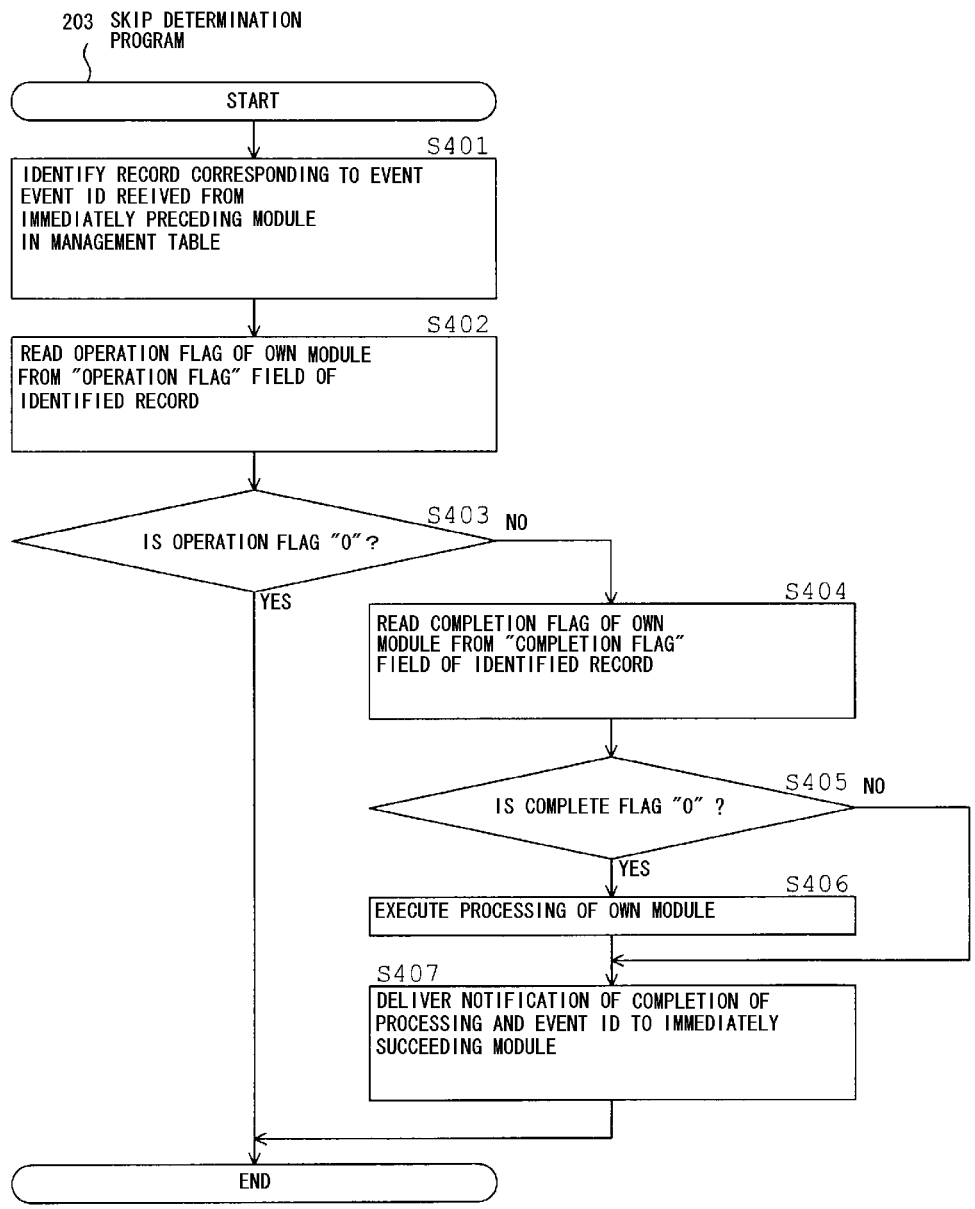
FIG. 8 is a view showing the flow of a skip determination process.

FIG. 8 is a view showing the flow of the skip determination process executed by the CPU 20d according to the skip determination program 213. Since any of the six modules 21a to 21f of the abnormality processing system can be the nucleus of the operation of the skip determination program 213 as described above, the operation nucleus is expressed merely as a module in the following description of the skip determination processing:

After the skip determination process is started, at S401, the CPU 20d executing the module identifies the record corresponding to the event ID received from the immediately preceding module together with the notification of the completion of the process from among the records recorded in the event management table 23 in the flash memory unit 20c.

At S402, the module reads the operation flag of its own module from the "operation flag" field of the record identified at S401.

At S403, the module determines whether the operation flag of its own module read at S402 is "0" or not. When the operation flag is "0", the module ends the skip determination process according to FIG. 8. On the other hand, when the operation flag of its own module is not "0", that is, when it is "1", the module diverges the process from S403 to S404.

At S404, the module reads the completion flag of its own module from the "completion flag" field of the record identified at S401.

At S405, the module determines whether the completion flag of its own module read at S404 is "0" or not. When the completion flag of its own module is "0", the module progresses the process from S405 to S406.

At S406, the module executes the process of its own module. After finishing the process, the module proceeds to the process of S407.

On the other hand, when it is determined at S405 that the completion flag of its own module read at S404 is not "0", the module does not perform the process of S406, that is, skips S406, and diverges the process from S405 to S407.

The CPU 20d executing S401 to S405 corresponds to the above-described determiner.

At S407, the module notifies the immediately preceding module of the completion of the process of its own module, and delivers the event ID to the immediately succeeding module. Thereafter, the module ends the skip determination process according to FIG. 8.

The CPU 20d executing S405 and S407 corresponds to the above-described deliverer.

According to the skip determination process of FIG. 8, the module can skip the process of its own module when after the event ID is received from the immediately preceding module, the process for the event associated with the received event ID has already been finished.

<Processing Associated with the Service Processor>

As mentioned above, the incomplete event detection program 24 detects an incomplete event immediately after the power of the service processor 20 is turned on. The incomplete event detection program 24 is executed immediately after the power of the service processor 20 is turned on. The power-on of the service processor 20 may be normal power-on performed by the operator after normal power-off or may be power-on accompanying a reboot of the service processor 20. In any case, in the present embodiment, when the power of the service processor 20 is turned on, the incomplete event detection program 24 is executed.

Figure 9:
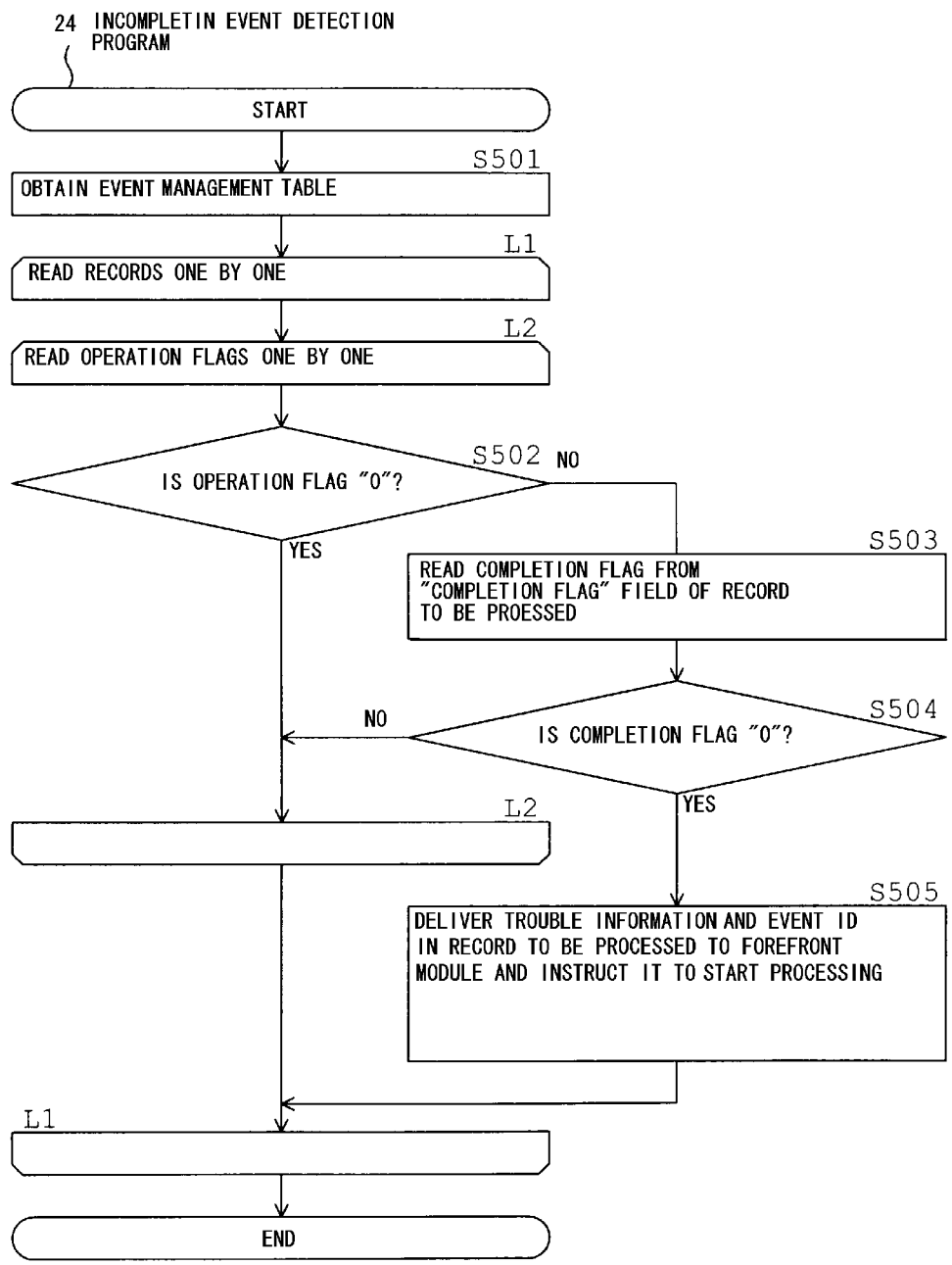
FIG. 9 is a view showing the flow of an incomplete event detection process.

FIG. 9 is a view showing the flow of the incomplete event detection process executed by the CPU 20d according to the incomplete event detection program 24.

After the incomplete event detection process is started, at S501, the CPU 20d obtains the event management table 23 of FIG. 5 from the flash memory unit 20c. Then, the CPU 20d executes a first processing loop L1.

In the first processing loop L1, the CPU 20d executes the process of a second processing loop L2 on the read record while reading records one by one from the event management table 23 obtained at S501. The first processing loop L1 is executed on each of the records read from the event management table 23.

In the second processing loop L2, the CPU 20d executes the process of S502 to S504 on the read operation flag while successively reading the operation flags corresponding to the modules one by one from the "operation flag" field of the record to be processed. The second processing loop L2 is executed on each of the operation flags read from the event management table 23.

At S502, the CPU 20d determines whether the operation flag of the record to be processed read from the event management table 23 is "0" or not. When the operation flag of the record to be processed is "0", the CPU 20d ends the round of this operation flag to be processed in the second processing loop L2. On the other hand, when the operation flag to be processed is not "0", the CPU 20d diverges the process from S502 to S503.

At S503, the CPU 20d reads the completion flag of the module corresponding to the operation flag of the record to be processed, from the "completion flag" field of the record to be processed.

At S504, the CPU 20d determines whether the completion flag read at S503 is "0" or not. When the completion flag is not "0", the CPU 20d diverges the process from S504, and ends the round of this operation flag to be processed in the second processing loop L2. On the other hand, when the completion flag is "0", the CPU 20d proceeds to the process from S504 to S505.

When the process does not proceed to S505 for any of the operation flags in the "operation flag" field of the record to be processed, after finishing the process of S502 to S504 for all the operation flags, the CPU 20d leaves the second processing loop L2, and ends the round of this record to be processed in the first processing loop L1.

On the other hand, when proceeding to S505 with respect to any of the operation flags in the "operation flag" field of the record to be processed as a result of S504, the CPU 20d determines that the event associated with the record to be processed is an incomplete event, and leaves the second processing loop L2 halfway.

The CPU 20d executing S501 to S504 corresponds to the above-described identifier. S501 to S504 correspond to the above-described identification procedure.

At S505, the CPU 20d delivers the trouble information and the event ID recorded in the "data" field and the "event ID" field of the record to be processed, respectively, to the forefront trouble information reception module 21a in the execution sequence, and instructs the trouble information reception module 21a to start the process. Thereafter, the CPU 20d ends the round of this record to be processed in the first processing loop L1.

The CPU 20d executing S505 corresponds to the above-described instructor. S505 corresponds to the above-described instruction procedure.

After finishing the second processing loop L2 and the process of S502 to S505 for all the records in the event management table 23 read at S501, the CPU 20d leaves the first processing loop L1, and ends the incomplete event detection process according to FIG. 9.

According to the incomplete event detection process of FIG. 9, when there is even one combination of an operation flag in the state of "1" and a completion flag in the state of "0" for one record to be processed, the CPU 20d determines that the event associated with the record to be processed is an incomplete event, and can deliver the trouble information and the event ID related to the incomplete event to the forefront trouble information reception module 21a.

When instructed to start the process by the incomplete event detection process, the trouble information reception module 21a executes the process of its own module based on the trouble information and the event ID received simultaneously with the process start instruction without executing the event ID issuance program 210.

In the first embodiment, the trouble information reception module 21a issues an event ID every time trouble information is received from a unit in the main frame computer 10, and adds the record corresponding to the event to the event management table 23.

When completing the process of its own module, the upstream side modules 21a to 21c whose operation settings are always fixed to be valid each deliver the process completion notification and the event ID to the immediately succeeding modules according to the completion flag switching program 212. Moreover, the modules 21a to 21c each switch, from "0" to "1", the completion flag of their own modules of the record corresponding to the event in the event management table 23 of FIG. 5.

Moreover, of the downmost stream side modules 21d to 21f, the module whose operation setting is valid also switches, when finishing external output by completing the process of its own module, the completion flag of the record corresponding to the event in the event management table 23 from "0" to "1".

Therefore, as shown in the event management table 23 of FIG. 5, when the operation settings of four modules 21a, 21b, 21c, and 21e are valid at the time of the occurrence of an event with an event ID "0013", when all of the modules 21a, 21b, 21c, and 21e have completed the process for the event, the combination of the completion flags is "111010" which coincides with the combination of the operation flags "111010".

Moreover, as shown in the event management table 23 of FIG. 5, in a case where the operation settings of five modules 21a to 21e are valid at the time of the occurrence of an event with an event ID "0014", when trouble occurs in the service processor 20 before the completion of the process of the instruction distribution module 21c related to the event and the operations of the modules 21a to 21e are stopped, the combination of the completion flags is "110000" which does not coincide with the combination of the operation flags "111110". Since the event management table 23 is recorded not in the volatile memory unit 20e but in the flash memory unit 20c, even if the power of the service processor 20 is turned off once, the states of the operation and completion flags related to each event are never erased.

As described above, in the first embodiment, by the operation flag switching program 211 and the completion flag switching program 212 that each of the modules 21a to 21f has, the operation settings of all the modules 21a to 21f at the time of the occurrence of an event are recorded in the "operation flag" field for each event, and up to which module the process has been completed for one event is recorded in the "completion flag" field for each event.

Moreover, in the first embodiment, when the power of the service processor 20 is turned off once and turned on again, the incomplete event detection program 24 of FIG. 9 is executed. By the incomplete event detection program 24, for each event that already occurred before the occurrence of trouble, the service processor 20 searches for a module whose operation setting is valid at the time of the occurrence of the event and where the process of its own module for the event has not been completed.

When detecting a module whose operation setting is valid at the time of the occurrence of the event and where the process of its own module for the event has not been completed among the events that already occurred before the occurrence of trouble, the service processor 20 delivers the trouble information and the event ID related to the event to the forefront trouble information reception module 21a, and instructs the trouble information reception module 21a to start the process. Thereby, the event that is incomplete at the time of the occurrence of trouble is re-executed after a reboot, and the process of each module in the execution sequence is started.

Further, in the first embodiment, when receiving an event ID from the immediately preceding module, the modules 21a to 21f each determine whether the process of its own module has already been executed or not for the event represented by the event ID according to the skip determination program 213. When the process of its own module has already been executed for the event represented by the event ID, the modules 21a to 21f can each skip the process of its own module and notify the immediately succeeding module of the completion of the process.

As described above, in the first embodiment, by the skip determination program 213 that each of the modules 21a to 21f has, the module where the process has already been executed in the event that is incomplete before the occurrence of trouble skips the process of its own module when the process is re-executed after a reboot. Consequently, when the module is of a type that performs external output such as the log storage module 21b, the mail report module 21e, and the SNMP report module 21f, it is unnecessary to duplicately output the contents the same as those outputted to the outside before the occurrence of trouble, at the time of the re-execution after a reboot.

Moreover, according to the first embodiment, the modules on the upstream side do not have information on the modules on the downstream side of the immediately succeeding modules although having information on the immediately succeeding modules in order to provide notification of the completion of the process. Therefore, when a new module is added to the execution sequence, it is necessary only that information on the module notified of the process completion be adjusted only for the added module and the modules preceding and succeeding the added module without the need for updating the information that all the modules in the management software 21 have. The added module may include the operation flag switching program 211, the completion flag switching program 212, and the skip determination program 213.

[Second Embodiment]

In the first embodiment, there is only one service processor 20 that receives trouble information from any of the units in the main frame computer 10 as input information. However, similar effects are obtained in a so-called redundant structure in which a plurality of such service processors 20 is connected to all the units of the main frame computer 10. In a second embodiment, a redundant structure is adopted for the service processor 20.

Figure 10:
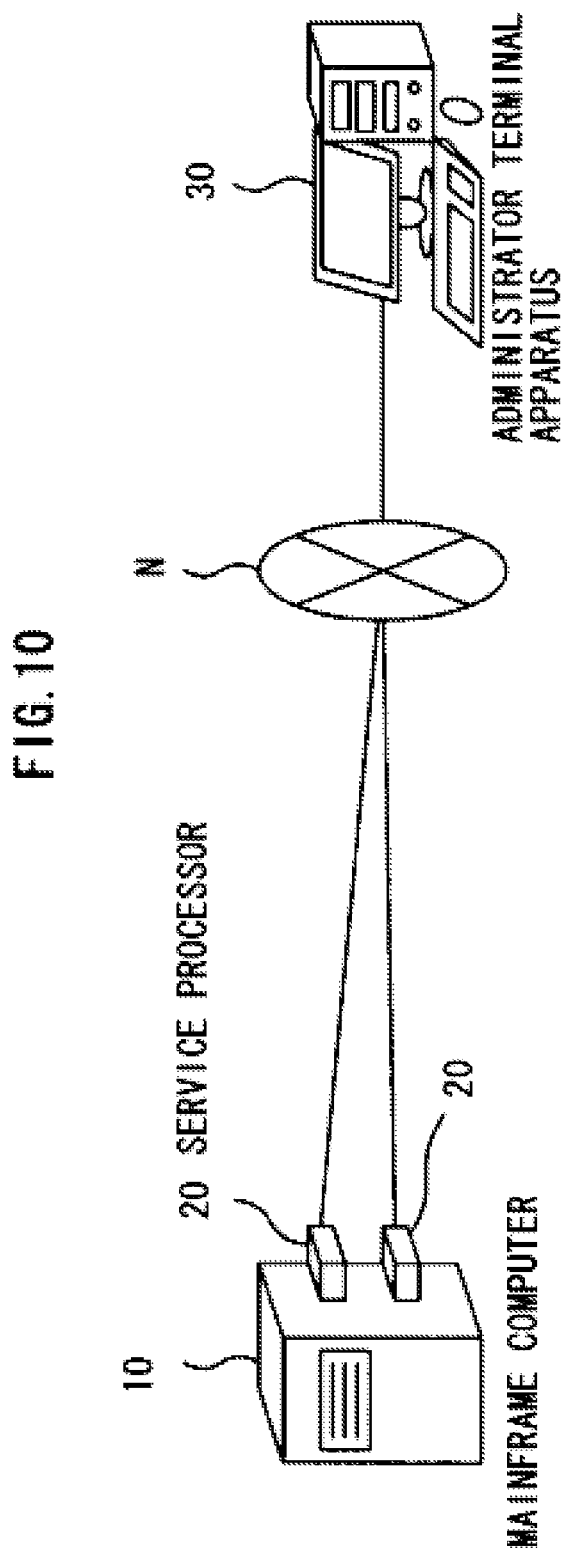
FIG. 10 is a structural view of a main frame system according to a second embodiment.

FIG. 10 is a structural view of a main frame system of a second embodiment.

As shown in FIG. 10, the main frame system of the second embodiment has the main frame computer 10, two service processors 20, and the administrator terminal apparatus 30. Of these, the two service processors 20 are connected so that communication can be performed with all the units in the main frame computer 10 through a non-illustrated private line. The two service processors 20 are also connected so that communication can be performed with the administrator terminal apparatus 30 through the network N.

Figure 11:
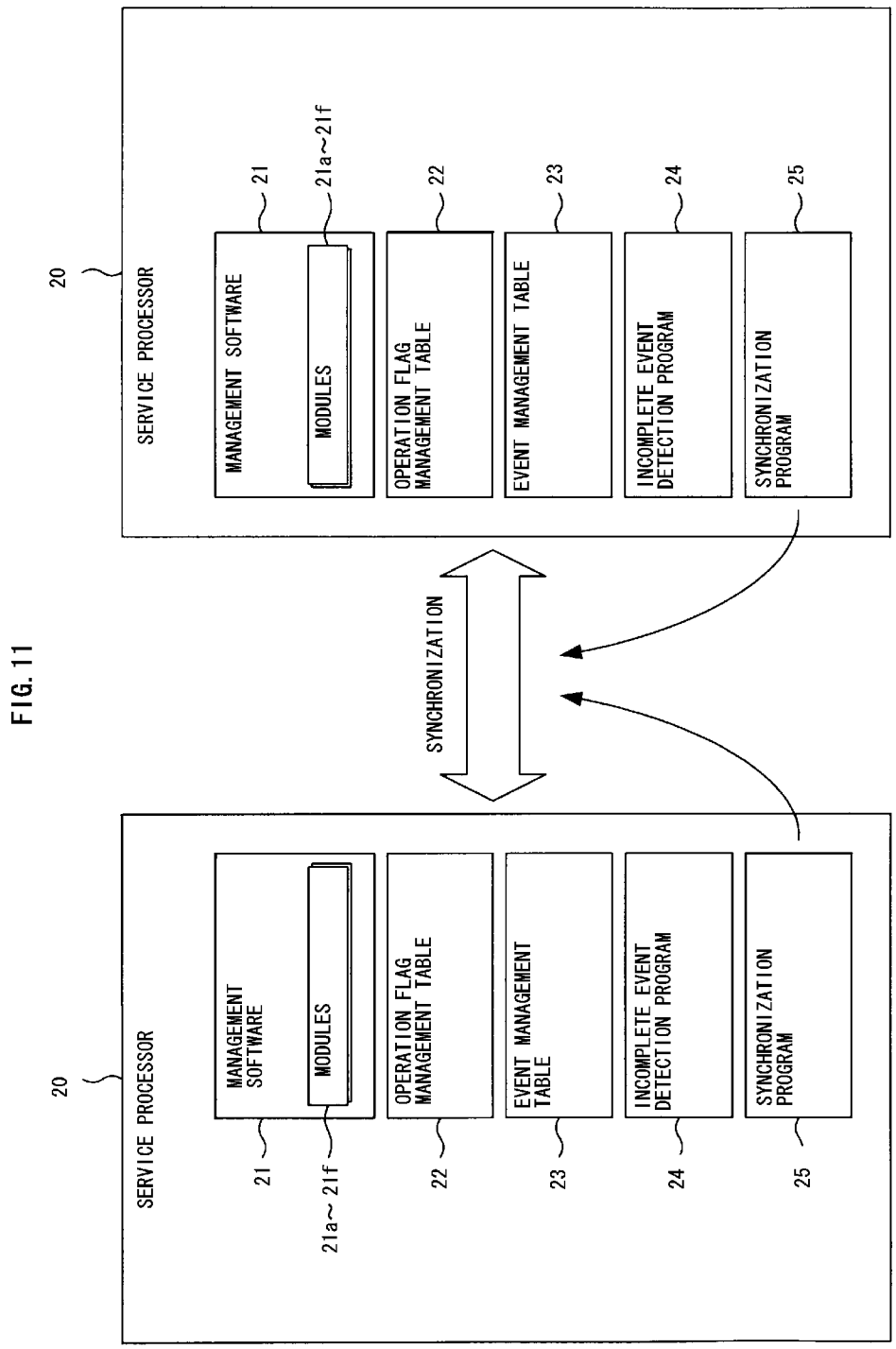
FIG. 11 is a view showing the relation between two service processors.

FIG. 11 is a view showing the relation between the two service processors 20 in the second embodiment.

The two service processors 20 in the second embodiment have the same hardware structure as that of FIG. 2. Moreover, as shown in FIG. 11, the management software 21, the operation flag management table 22, the event management table 23, and the incomplete event detection program 24 are stored in both of the two service processors 20. That is, the two service processors 20 in the second embodiment have the same software configuration.

However, unlike in the first embodiment, a synchronization program 25 is installed in each of the two service processors 20 according to the second embodiment. The synchronization program 25 defines the two service processors 20 as a master system and a slave system, respectively, and causes the updates made in the table 22 and the table 23 of the master system service processor 20 to be reflected in the table 22 and the table 23 of the slave system service processor 20 to thereby synchronize the tables 22 and the tables 23 of the two processors 20. The synchronization program 25 also performs control to cause, when the main power of one service processor 20 is shut off, the other service processor 20 to operate as the master system.

According to the second embodiment, even when trouble occurs in the master system service processor 20 and the operations of the modules 21a to 21e are stopped, the states of the operation flags and the states of the completion flags of the events at the time of the occurrence of the trouble are stored also in the slave system service processor 20 by the synchronization program 25. Therefore, when the service processor 20 in which no trouble is occurring is caused to operate as the master system because the main power of the service processor 20 in which trouble is occurring is shut off, by executing the incomplete event detection program 24 of FIG. 9 by the service processor 20 caused to operate as the master system, the event which became incomplete in the master system before the occurrence of the trouble is re-executed.

[Third Embodiment]

In the second embodiment, the same operation flag management tables 22 and the same event management tables 23 are stored in the two service processors 20, respectively, and the contents of the tables 22 and 23 of the two processors 20 are synchronized with each other. However, similar effects are obtained when the two service processors 20 share one pair of tables 22 and 23 with each other. In a third embodiment, the two service processors 20 share the operation flag management table 22 and the event management table 23.

Figure 12:
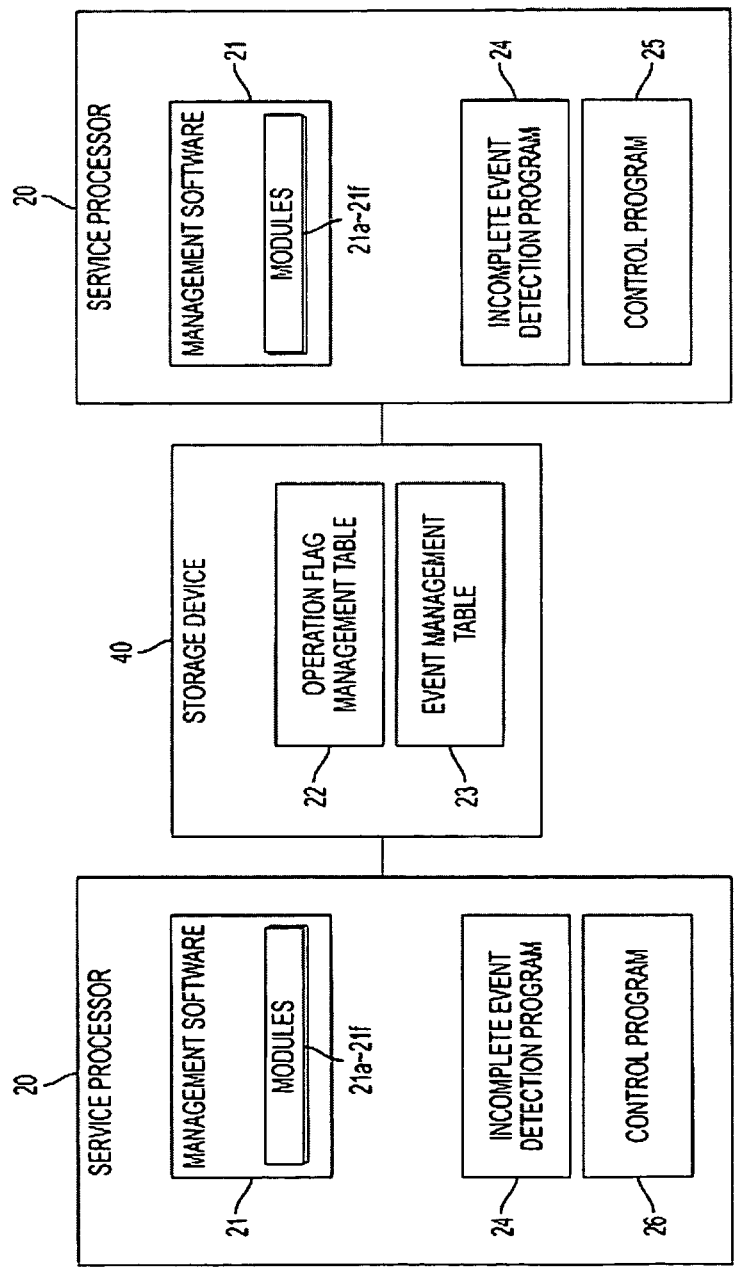
FIG. 12 is a view showing the relation between two service processors in a third embodiment.

FIG. 12 is a view showing the relation between the two service processors 20 in a third embodiment.

As shown in FIG. 12, in the third embodiment, the operation flag management table 22 and the event management table 23 are recorded in a storage device 40 to which the two service processors 20 are both accessibly connected. The modules 21a to 21f of each of the service processors 20 perform record addition, operation flag switching, and completion flag switching on the operation flag management table 22 and the event management table 23 in the storage device 40.

Moreover, in the third embodiment, instead of the synchronization program 25 of the second embodiment, a control program 26 is installed in the two service processors 20. The control program 26 defines the two service processors 20 as a master system and a slave system, respectively, and causes, when the main power of one service processor 20 is shut off, the other service processor 20 to operate as the master system.

According to the third embodiment, even when trouble occurs in the master system service processor 20 and the operations of the modules 21a to 21e are stopped, the states of the operation flags and the states of the completion flags of the events at the time of the occurrence of the trouble are stored in the storage device 40. Therefore, when the service processor 20 in which no trouble is occurring is caused to operate as the master system because the main power of the service processor 20 in which trouble is occurring is shut off, by executing the incomplete event detection program 24 of FIG. 9 by the service processor 20 caused to operate as the master system, the event which became incomplete in the master system before the occurrence of the trouble is continued.

<Explanation of the Units>

In the above-described embodiments, the interface unit 20a, the communication adapter 20b, the flash memory unit 20c, the CPU 20d, and the volatile memory unit 20e in the service processor 20 may all be constituted by software elements and hardware elements or by only hardware elements.

Examples of the software elements include an interface program, a driver program, a table, data, and a combination of some of these. These may be stored in a computer-readable medium described later or may be firmware fixedly incorporated in a storage device such as a ROM (read only memory) or an LSI (large scale integration).

Examples of the hardware elements include an FPGA (field programmable gate array), an ASIC (application specific integrated circuit), a gate array, a combination of logic gates, a signal processing circuit, an analog circuit, and other circuits. Of these, the logic gates may include an AND, an OR, a NOT, a NAND, a NOR, a flip-flop, and a counter circuit. The signal processing circuit may include a circuit element that performs the addition, multiplication, division (inversion), product-sum operation, differentiation, integration, and the like of signal values. The analog circuit may include a circuit element that performs amplification, addition, multiplication, differentiation, integration, and the like.

The elements constituting the interface unit 20a, the communication adapter 20b, and the units 20c to 20e in the above-described service processor 20 are not limited to the ones mentioned above, but may be other elements equivalent thereto.

<Explanation of the Software and the Programs>

In the above-described embodiments, the management software 21, the modules (programs) constituting the management software 21, the operation flag management table 22, the event management table 23, the incomplete event detection program 24, and the above-mentioned software elements in the service processor 20 may all include an elements such as a software part, a part by a procedural language, an object-oriented software part, a class part, a part managed as a task, a part managed as a process, a function, an attribute, a procedure, a subroutine, a software routine, a segments or a portion of a program code, a driver, firmware, a microcode, a code, a code segment, an extra segment, a stack segment, a program area, a data area, data, a database, a data structure, a field, a record, a table, a matrix table, an array, a variable, or a parameter.

Moreover, the management software 21, the modules constituting the management software 21, the operation flag management table 22, the event management table 23, the incomplete event detection program 24, and the above-mentioned software elements may all be described in the C language, C++, Java (a trademark of Sun Microsystems, Inc. USA), Visual Basic (a trademark of Microsoft Corporation USA), Perl, Ruby, or any of the other many programming languages.

Moreover, the management software 21, the modules constituting the management software 21, the operation flag management table 22, the event management table 23, the incomplete event detection program 24, and the instructions, codes and data included in the above-mentioned software elements may be transmitted to or loaded into a computer or a computer incorporated in a machine or an apparatus through a wire network card and a wire network or through a radio card or a radio network.

In the above-mentioned transmission or loading, data signals move on the wire network or the radio network, for example, by being embodied as carrier waves. However, data signals may remain as base band signals when they are transferred instead of being embedded as carrier waves as mentioned above. Such carrier waves are transmitted in an electric, magnetic, or electromagnetic form, as light or sound, or in other forms.

Here, the wire network or the radio network is, for example, a telephone line, a network line, a cable (including an optical cable and a metal cable), a radio link, a mobile telephone access line, a PHS (personal handy phone system) network, a radio LAN (local area network), Bluetooth (a trademark of SIG), a vehicle-mounted radio communication (including DSRC [dedicated short range communication]), or a network constituted by any of these. The data signals transmit information including an instruction, a code and data to a node or an element on the network.

The management software 21, the operation flag management table 22, the event management table 23, the incomplete event detection program 24, and the elements constituting the above-mentioned software elements are not limited to the ones mentioned above, but may be other elements equivalent thereto.

<Explanation of the Computer-Readable Medium>

Any of the functions in the above-described embodiments may be coded and stored in a storage area of a computer-readable medium. In this case, a program to implement the function can be provided to a computer or a computer incorporated in a machine or an apparatus through a computer-readable medium. The computer or the computer incorporated in a machine or an apparatus can implement the function by reading the program from a storage area of the computer-readable medium and executing the program.

Here, the computer-readable medium is a recording medium that stores information such as a program and data and holds the information in a state of being readable by a computer, by an electric, magnetic, optical, chemical, physical, or mechanical action.

Examples of the electric or magnetic action include data writing into a device on a ROM (read only memory) constituted by a fuse. Examples of the magnetic or physical action include development of toner to a latent image on a paper medium. Information recorded on a paper medium can be read, for example, optically. Examples of the optical and chemical action include thin film formation and asperity formation on a substrate. Information recorded in the form of asperities can be read, for example, optically. Examples of the chemical action include an oxidation-reduction reaction on a substrate, oxide film formation on a semiconductor substrate, nitride film formation, and a photoresist phenomenon. Example of the physical or mechanical action include asperity formation on an embossed card and hole punching in a paper medium.

Some computer-readable media are detachably attachable to a computer or a computer incorporated in a machine or an apparatus. Examples of the detachably attachable computer-readable medium include a DVD (digital versatile disk) (including DVD±R [recordable], DVD-Video, DVD-ROM [read only memory], DVD-RAM [random access memory], and HD [high definition] DVD), a BD (blue-ray disk) (including BD-R, BD-RE [rewritable], BD-ROM, and BD-Video), a CD (compact disk) (including CD-R, CD-RW, and CD-ROM), an MO (magneto-optical) disk, other optical disk media, a flexible disk, a floppy disk (floppy is a trademark of Hitachi, Ltd.), other magnetic disk media, a memory card (Compact Flash [a trademark of SanDisk Corporation USA], Smart Media [a trademark of Toshiba Corporation], SD card [a trade mark of SanDisk Corporation USA, Matsushita Electric Industrial Co., Ltd., and Toshiba Corporation], Memory Stick [a trademark of Sony Corporation], MMC [a trademark of Siemens USA and SanDisk Corporation USA], etc.), magnetic tape, other tape media, and a storage device incorporating any of these. Some storage devices further incorporate a DRAM (dynamic random access memory) or an SRAM (static random access memory).

Moreover, some computer-readable media are fixedly mounted on a computer or a computer incorporated in a machine or an apparatus. Examples of this type of computer-readable medium include a hard disk, a DRAM, an SRAM, a ROM, an EEPROM (electronically erasable and programmable read only memory), and a flash memory.

Further, the computer-readable medium may be included in a computer network system coupled through a network. Information including an instruction, a code, and data stored in such a system is executed in a distributed processing environment.

As described above, according to a mode of the present invention, with respect to an event for which the process has not been completed by at least one of the modules, identification information is provided to the forefront module, and the contents outputted from any of the modules with respect to the event are never duplicately outputted from the same module.

Although a few preferred embodiments of the present invention have been shown and described, it would be appreciated by those skilled in the art that changes may be made in these embodiments without departing from the principles and spirit of the invention, the scope of which is defined in the claims and its equivalents.

What is claimed is:

1. An information processing apparatus for executing a program including a plurality of modules for which a predetermined execution sequence is defined, the information processing apparatus comprising:
   a storage that stores identification information for identifying an event that occurred in a forefront module among the plurality of modules in the execution sequence for the event and completion information for identifying a module having completed a process for the event that occurred; and
   a processor that executes the program including a procedure, the procedure including:
   identifying an event for which at least one of the modules has not completed a process, based on the completion information in the storage,
   providing the identification information related to the event identified by the identifying to the forefront module in the execution sequence, and
   instructing the forefront module to execute the uncompleted process related to the identified event,
   wherein each of the modules perform:
   reading, when any identification information is received, the completion information corresponding to the received identification information from the storage, determining whether to skip a process of its own module based on the read completion information, and delivering, when there is an immediately succeeding module, the identification information to the immediately succeeding module in a case where the determining determines to skip its own process.

2. The information processing apparatus according to claim 1, wherein the completion information includes a plurality of completion flags representative of whether the modules have completed the process or not, respectively, and the determiner determines whether to skip the process of its own module or not based on a state of the completion flag, corresponding to its own module, in the completion information.

3. The information processing apparatus according to claim 1, wherein the identification of the event for which at least one of the modules has not completed the process is performed upon turning on of a main power.

4. The information processing apparatus according to claim 1, wherein in the information processing apparatus, a module, whose operation setting is valid, of a plurality of modules whose operation settings are switchable between valid and invalid and for which the predetermined execution sequence is defined is caused to execute the process, the storage stores, for each event occurring in the forefront module in the execution sequence, the identification information to identify the event that occurred for each event, operation information to identify states of the operation settings of all the modules at the point of time of the occurrence of the event, and the completion information to identify the module having completed the process for the event that occurred, the identifier identifies the event for which at least one of the modules whose operation settings are valid has not completed the process, based on the operation information and the completion information stored in the storage, and the determiner of each module reads, when any identification information is received, the operation information and the completion information corresponding to the received identification information from the storage, and determines whether to skip the process of its own module or not based on the read operation information and completion information.

5. The information processing apparatus according to claim 4, wherein the operation information includes a plurality of operation flags representative of whether the operation settings of the modules are valid or invalid, respectively, the completion information includes a plurality of completion flags representative of whether the modules have completed the process or not, respectively, and the determiner determines whether to skip the process of its own module or not based on a state of the operation flag, corresponding to its own module, in the operation information and a state of the completion flag, corresponding to its own module, in the completion information.

6. An information processing method in which a plurality of modules for which a predetermined execution sequence is defined is caused to execute a process, the process comprising:

storing identification information to identify an event that occurred in a forefront module among the plurality of modules in the execution sequence for the event and completion information to identify a module having completed a process for the event that occurred;

identifying an event for which at least one of the modules has not completed a process, based on the completion information in the storage, providing the identification information related to the event identified by the identifying to the forefront module in the execution sequence;

instructing the forefront module to execute the uncompleted process related to the identified event;

reading, when any identification information is received, the completion information corresponding to the received identification information from the storage, determining whether to skip a process of its own module based on the read completion information, and delivering, when there is an immediately succeeding module, the identification information to the immediately succeeding module in a case where the determining determines to skip its own process.

7. The information processing method according to claim 6, wherein the completion information includes a plurality of completion flags representative of whether the modules have completed the process or not, respectively, and the modules each determine whether to skip the process of its own module or not based on a state of the completion flag, corresponding to its own module, in the completion information.

8. A non-transitory recording medium storing a program having a plurality of modules for which a predetermined execution sequence is defined and causing a computer to execute a process related to the modules, wherein the program causes the computer to function as:

storage means for storing, in a storage device, identification information to identify an event that occurred in a forefront module among the plurality of modules in the execution sequence for the event and completion information to identify a module having completed a process for the event that occurred; and identification means for identifying an event for which at least one of the modules has not completed a process, based on the completion information in the storage, instruction means for providing the identification information related to the event identified by the identification means to the forefront module in the execution sequence, and instructing the forefront module to execute the uncompleted process related to the identified event, wherein each of the modules includes:

a determiner that reads, when any identification information is received, the completion information corresponding to the received identification information from the storage, and determines whether to skip a process of its own module based on the read completion information; and a deliverer that delivers, when there is an immediately succeeding module, the identification information to the immediately succeeding module in a case where the determiner determines to skip its own process.

\* \* \* \* \*